Patented Jan. 5, 1954

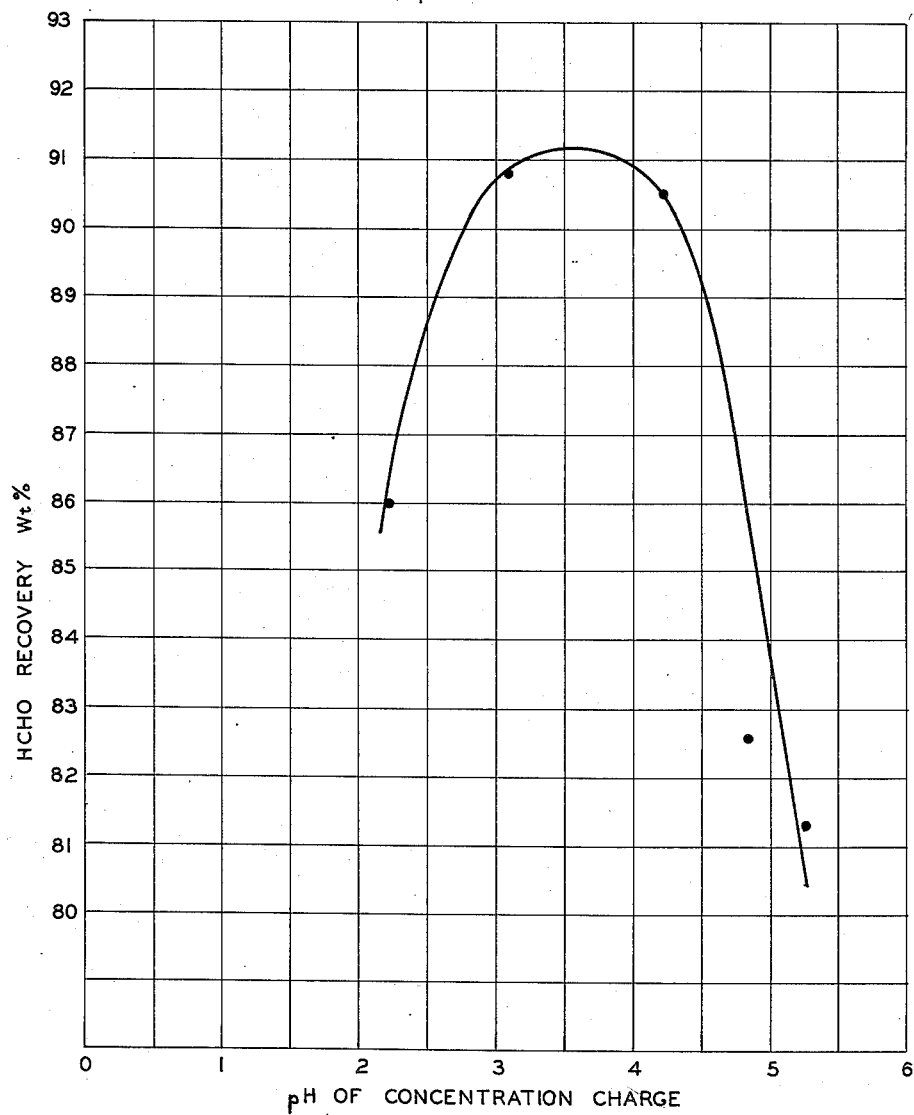

2,665,241

UNITED STATES PATENT OFFICE 2,665,241

CONCENTRATION OF AQUEOUS FORMALDEHYDE SOLUTIONS

Louis G. Willke, Barnsdall, and Ignace L. Malm, Tallant, Okla., and Howard L. Malakoff, Yonkers, N. Y., assignors to Cities Service Oil Company, Bartlesville, Okla., a corporation of Delaware Application June 3, 1948, Serial No. 30,893

2 Claims. (Cl. 202—57)

This invention relates to improvements in the concentration of aqueous formaldehyde solutions and more particularly to the vacuum concentration of such solutions under controlled pH conditions.

Aqueous formaldehyde solutions having a formaldehyde concentration below 38 per cent may be processed at low subatmospheric pressures to take off a weak formaldehyde distillate and to recover a concentrated aqueous solution of formaldehyde containing from about 38 to 50 per cent formaldehyde by weight, this concentrate being thereafter subjected to various finishing treatments to produce the standard 37 per cent formaldehyde of commerce.

When carried out under varying pH conditions the losses of formaldehyde in the weak overhead distillate may be quite large, in some instances as much as 20 per cent or more of the formaldehyde originally charged to the still. It is important that the losses of formaldehyde be held to the lowest possible amount in order that the process of concentrating formaldehyde under vacuum conditions may be economically practicable.

It is an object of this invention to provide an improved process for effecting the concentration of aqueous formaldehyde solutions and for reducing the formaldehyde loss normally incident to such treatment.

We have discovered that if the subatmospheric pressure concentration of an aqueous formaldehyde solution is effected under conditions such that the pH value of the solution is maintained between 3 and 4, the formaldehyde loss is very substantially reduced. We have found that while the total recovery of formaldehyde is dependent to some extent upon the amount and character of the impurities present, that the impurities apparently have no effect upon the optimum pH of the solution undergoing concentration, and that no matter what type of impurities may be present, or their amount, the final formaldehyde recovery is very substantially increased when the pH is maintained between 3 and 4.

The attached drawing, forming a part of this specification, represents the recovery curve of a series of formaldehyde concentrations carried out at varying pH's and from various stocks. The points on the curve have been adjusted for variations in impurity content of the stock, variations in the concentration of the feed and dump, and for variations in the rate of distillation, all of which are variables affecting the final recovery of formaldehyde. However, the effect of these variables upon the recoveries of formaldehyde during the concentration step may be calculated so that the recovery may be correlated to standard conditions of feed and dump, rate of distillation, and impurities present.

The data used in making the curve in the figure were obtained by carrying out the concentrating operations in a concentrating kettle having a capacity of about 125 gallons. The charge of formaldehyde in each run was approximately 80 gallons. This concentrating unit is comparable in its results to a plant size unit used for concentrating formaldehyde solutions, and standard instrumentation was employed to control the process.

Referring again to the drawing, the curve shows the effect of carrying out concentrating operations at optimum rates on formaldehyde solutions maintained at different pH values. We have found that, as shown by the curve, the pH value of the formaldehyde solution being concentrated apparently has a critical influence upon the vapor pressure of the formaldehyde in solution during the concentration. The curve shows that when the pH value of the solution being concentrated is maintained at about 3.4 that optimum recoveries of formaldehyde in the concentrate may be obtained. At pH values above or below this point the recovery will fall, and will drop off very sharply if the pH varies widely from 3.4. However, good recoveries are generally obtained within a pH range of from about 3.3 to about 3.6 while generally satisfactory recoveries are obtainable between pH's of 3 and 4.

It will be noted from a consideration of the curve that if the pH value is allowed to change from the optimum as much as two points in either direction that the vacuum concentration may result in an increased formaldehyde loss as high as 10 per cent or more.

A number of runs were made to substantiate the indicated effect of the pH upon the recovery of formaldehyde of which five runs corresponding to the points shown in the figure are typical. Data for these five runs are as follows:

| Run No. | 1 | 2 | 3 | 4 | 5 |
|---|---|---|---|---|---|
| Charge: | | | | | |
| Pounds | 730 | 730 | 730 | 754 | 730 |
| HCHO, weight percent | 30.46 | 31.07 | 30.06 | 33.86 | 32.86 |
| pH | 2.3 | 3.1 | 4.2 | 4.85 | 5.3 |
| Impurity content, weight percent | 3.4 | 3.2 | 4.15 | 3.3 | 3.5 |
| Conditions of run: | | | | | |
| Pressure in hg | 2.25 | 2.25 | 2.25 | 2.25 | 2.25 |
| Distillation rate, g. p. h. | 5.90 | 4.62 | 4.62 | 4.0 | 7.06 |
| Concentrate dump: | | | | | |
| Pounds | 438.2 | 505.5 | 465.5 | 537.0 | 456.0 |
| HCHO, weight percent | 42.46 | 40.91 | 40.94 | 41.85 | 42.74 |
| HCHO recovery | 83.68 | 91.18 | 86.87 | 88.01 | 81.30 |
| HCHO loss | 16.32 | 8.82 | 13.13 | 11.99 | 18.70 |
| 1. Correction factor | 11.5/12.0 | 11.5/9.84 | 11.5/10.88 | 11.5/7.99 | 11.5/9.88 |
| Loss over standard range | 15.63 | 10.32 | 13.88 | 17.28 | 21.80 |
| Recovery over standard range | 84.37 | 89.68 | 86.12 | 82.72 | 78.20 |
| 2. Rate factor | 91.2/90.3 | 91.2/91.55 | 91.2/91.55 | 91.2/91.9 | 91.2/88.6 |
| 3. Impurity factor | 91.5/90.6 | 91.5/91.2 | 91.5/87.8 | 91.5/90.9 | 91.5/90.5 |
| Corrected recovery | 86.0 | 89.7 | 89.4 | 82.6 | 81.4 |

The method of making correction (1) above is as follows: Concentration from 30 per cent formaldehyde to 41.5 per cent formaldehyde was adopted as standard, being an increase in formaldehyde concentration of 11.5 per cent. It was found that the amount of formaldehyde carried overhead is more or less a straight line function of the percentage of concentration; thus in run No. 1 the formaldehyde was concentrated from a percentage of 30.46 to a percentage of 42.46, an increase of 12 percentage points. Therefore the loss should be corrected by the factor of 11.5/12.0 to correlate the results to standard conditions.

For correction (2), the rate factor, it has been found, as stated in our application filed concurrently herewith, that the recovery will vary with the rate of distillation, and that curves may be plotted showing the optimum distillation rate for a particular stock having certain impurities in known quantities and of known character. Five gallons per hour or 6.25% of the charge per hour was adopted as the standard rate and the correction for varying rates of distillation may be determined from developed curves. Thus in run No. 1 the rate correction factor would be 91.2/90.3.

The correction for the impurity factor may likewise be computed from curves which we have determined for various impurities of various natures. Therefore, in run No. 1, the charging stock of which had a weight impurity of 3.4 per cent, the recovery factor, based upon a standard impurity content of 2.5 per cent, was 91.5/90.6.

When corrected for all these factors it will be seen that in run No. 1 at a pH of 2.3, all other factors being standard, a recovery of 86 per cent of formaldehyde may be expected. The other runs were corrected for the various variables in a similar manner.

It will thus be seen that by an accurate control of the pH of an aqueous formaldehyde solution during vacuum concentration that the recoveries of formaldehyde may be substantially increased. If the pH of the solution is held as close as possible to an optimum of 3.4, maximum recoveries of formaldehyde in the concentrate may be obtained. In actual plant practice this may result in a very substantial increase in production of formaldehyde over the course of a year and may well make the difference between an uneconomic and an economic production of formaldehyde.

Having now described our invention, what is claimed as new is:

1. The process of concentrating aqueous formaldehyde solutions at low subatmospheric pressures which comprises charging an aqueous formaldehyde stock having a pH less than about 3 to a concentrating zone, adjusting the pH value of the charging stock to a value of about 3.4, subjecting the charging stock to a low subatmospheric pressure, heating the charging stock to vaporize a portion thereof, recovering as an overhead product an aqueous solution relatively poor in formaldehyde, and recovering as a bottoms product as aqueous formaldehyde solution richer in formaldehyde than the charging stock.

2. The process of concentrating aqueous formaldehyde solutions at low subatmospheric pressures which comprises charging an aqueous formaldehyde solution containing less than 38 percent formaldehyde by weight and having a pH less than about 3 to a concentrating zone, adjusting the pH value of the charging stock to a value of about 3.4, subjecting the charging stock to a low subatmospheric pressure, heating the charging stock to vaporize a portion thereof, recovering as an overhead product an aqueous solution relatively poor in formaldehyde, and recovering as a bottoms product an aqueous formaldehyde solution containing more than 38 percent formaldehyde by weight.

LOUIS G. WILLKE.
IGNACE L. MALM.
HOWARD L. MALAKOFF.

References Cited in the file of this patent

UNITED STATES PATENTS

| Number | Name | Date |
|---|---|---|
| 2,000,152 | Walker | May 7, 1935 |
| 2,116,783 | Finkenbeiner | May 10, 1938 |
| 2,153,526 | Walker | Apr. 4, 1939 |
| 2,237,092 | Swain | Apr. 1, 1941 |
| 2,267,290 | Somerville | Dec. 23, 1941 |
| 2,369,504 | Walker | Feb. 13, 1945 |

OTHER REFERENCES

Walker: "Formaldehyde," Reinhold Pub. Co., 1944, pages 39 to 63.